(12) United States Patent
Kondajeri et al.

(10) Patent No.: US 7,516,370 B2
(45) Date of Patent: *Apr. 7, 2009

(54) METHOD, SYSTEM, COMPUTER PROGRAM PRODUCT, AND COMPUTER SYSTEM FOR ERROR MONITORING OF PARTITIONS IN THE COMPUTER SYSTEM USING PARTITION STATUS INDICATORS

(75) Inventors: Preetha R. Kondajeri, Bangalore (IN); Ravi K. Kulkarni, Bangalore (IN); Manish Misra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/856,988

(22) Filed: Sep. 18, 2007

(65) Prior Publication Data

US 2008/0010559 A1    Jan. 10, 2008

Related U.S. Application Data

(63) Continuation of application No. 11/029,778, filed on Jan. 4, 2005, now Pat. No. 7,321,987.

(51) Int. Cl.
*G06F 11/00* (2006.01)
(52) U.S. Cl. ....................................................... 714/49
(58) Field of Classification Search ................... 714/48, 714/49
See application file for complete search history.

(56) References Cited

U.S. PATENT DOCUMENTS

| 5,253,344 | A | 10/1993 | Bostick et al. |
| 5,930,831 | A | 7/1999 | Marsh et al. |
| 6,199,179 | B1 | 3/2001 | Kauffman et al. |
| 7,325,163 | B2 * | 1/2008 | Kondajeri et al. ............. 714/25 |
| 2002/0124215 | A1 | 9/2002 | Austen et al. |

\* cited by examiner

*Primary Examiner*—Bryce P Bonzo
(74) *Attorney, Agent, or Firm*—Schmeiser, Olsen & Watts; William H. Steinberg

(57) ABSTRACT

A method, computer system, and computer program product for error monitoring partitions in the computer system. Provided to each partition is a partition status indicator (PSI) denoting a RUNNING or FAIL status of the partition. During booting, it is ascertained whether each partition has the RUNNING or FAIL status, and the PSI of each partition is accordingly set to the RUNNING status or the FAIL status, respectively. An error procedure performed for each first partition whose partition status indicator indicates the FAIL status includes: copying each error entry in the ELA of the first partition whose ESI indicates the UNREAD status into the ELA of a second (running) partition; setting the ESI to the READ status for each copied error entry in the ELA of the first partition; and having the ESI set to the UNREAD status for each copied error entry in the ELA of the second partition.

18 Claims, 10 Drawing Sheets

38 (ERROR LOG AREA)

| ENTRY (1) | ENTRY (2) | ... | ENTRY (N) |

*FIG. 5*

| ENTRY ITEM | DESCRIPTION |
|---|---|
| PI | PARTITION IDENTIFIER |
| ESI | ENTRY STATUS INDICATOR (READ/UNREAD STATUS) |
| ED | ERROR DESCRIPTOR |

METHOD, SYSTEM, COMPUTER PROGRAM PRODUCT, AND COMPUTER SYSTEM FOR ERROR MONITORING OF PARTITIONS IN THE COMPUTER SYSTEM USING PARTITION STATUS INDICATORS

This application is a Continuation of Ser. No. 11/029,778, filed Jan. 4, 2005 now U.S. Pat. No. 7,321,987.

BACKGROUND OF THE INVENTION

1. Technical Field

The present invention relates to error monitoring of partitions in a computer system.

2. Related Art

In a data processing system with plurality of partitions, if a partition has stopped due to error(s) at boot time or run time of the partition, information about the last error may be available only on the virtual operator panel for the partition and the history of the error(s) is not immediately or soon available. Thus, recovery action or problem diagnostics cannot be timely performed. Further, there is no guarantee that the error history will be available, since the error history depends upon the failed partition being rebooted successfully at the next rebooting of the partition. Thus, there is a need for a method that promotes timely recovery of the partition from the error(s).

SUMMARY OF THE INVENTION

The present invention provides a method for error monitoring of a plurality of partitions in a computer system, said method comprising executing a computer readable program code stored on at least one computer usable medium of the computer system, said executing comprising:

providing a partition status indicator (PSI) for each partition of the plurality of partitions, said partition status indicator denoting a RUNNING status or a FAIL status of the partition;

providing an error log area for each partition, said error log area configured to store at least one error entry pertaining to the partition, each error entry including an entry status indicator (ESI), said entry status identifier indicating a READ status or UNREAD status of the error entry;

ascertaining, during a booting of each partition, whether each partition has the RUNNING status or the FAIL status and setting the partition status indicator of each partition as the RUNNING status or the FAIL status if said ascertaining has ascertained that each partition has the RUNNING status or the FAIL status, respectively;

examining the partition status indicator of each partition to determine whether the partition has the FAIL status, each examined partition being denoted as a first partition; and performing an error procedure for each first partition having the FAIL status as determined by said examining, said performing comprising:

copying each error entry in the error log area of the first partition whose entry status indicator indicates the UNREAD status into the error log area of a second partition of the plurality of partitions, said second partition being a running partition;

setting the entry status indicator to the READ status for each copied error entry in the error log area of the first partition; and having the entry status indicator set to the UNREAD status for each copied error entry in the error log area of the second partition.

The present invention provides a computer program product, comprising at least one computer usable medium having a computer readable program code embodied therein, said computer readable program code comprising an algorithm adapted to implement a method for monitoring a plurality of partitions in a computer system, said method comprising:

providing a partition status indicator (PSI) for each partition of the plurality of partitions, said partition status indicator denoting a RUNNING status or a FAIL status of the partition;

providing an error log area for each partition, said error log area configured to store at least one error entry pertaining to the partition, each error entry including an entry status indicator (ESI), said entry status identifier indicating a READ status or UNREAD status of the error entry;

ascertaining, during a booting of each partition, whether each partition has the RUNNING status or the FAIL status and setting the partition status indicator of each partition as the RUNNING status or the FAIL status if said ascertaining has ascertained that each partition has the RUNNING status or the FAIL status, respectively;

examining the partition status indicator of each partition to determine whether the partition has the FAIL status, each examined partition being denoted as a first partition; and performing an error procedure for each first partition having the FAIL status as determined by said examining, said performing comprising:

copying each error entry in the error log area of the first partition whose entry status indicator indicates the UNREAD status into the error log area of a second partition of the plurality of partitions, said second partition being a running partition;

setting the entry status indicator to the READ status for each copied error entry in the error log area of the first partition; and having the entry status indicator set to the UNREAD status for each copied error entry in the error log area of the second partition.

The present invention provides a computer system comprising a processor, a plurality of partitions, and a computer readable memory unit coupled to the processor, said memory unit containing instructions that when executed by the processor implement a method for monitoring the plurality of partitions in a computer system, said method comprising the computer implemented steps of:

providing a partition status indicator (PSI) for each partition of the plurality of partitions, said partition status indicator denoting a RUNNING status or a FAIL status of the partition;

providing an error log area for each partition, said error log area configured to store at least one error entry pertaining to the partition, each error entry including an entry status indicator (ESI), said entry status identifier indicating a READ status or UNREAD status of the error entry;

examining the partition status indicator of each partition to determine whether the partition has the FAIL status, each examined partition being denoted as a first partition;

ascertaining, during a booting of each partition, whether each partition has the RUNNING status or the FAIL status and setting the partition status indicator of each partition as the RUNNING status or the FAIL status if said ascertaining has ascertained that each partition has the RUNNING status or the FAIL status, respectively;

performing an error procedure for each first partition having the FAIL status as determined by said examining, said performing comprising:

copying each error entry in the error log area of the first partition whose entry status indicator indicates the UNREAD status into the error log area of a second partition of the plurality of partitions, said second partition being a running partition;

setting the entry status indicator to the READ status for each copied error entry in the error log area of the first partition; and having the entry status indicator set to the UNREAD status for each copied error entry in the error log area of the second partition.

The present invention advantageously promotes timely recovery of a partition of a computer system from an error relating to the partition.

BRIEF DESCRIPTION OF THE DRAWINGS

FIG. 5 illustrates an error log area of FIG. 4 having error entries therein, in accordance with embodiments of the present invention.

FIG. 6 depicts content in an error entry of FIG. 5, in accordance with embodiments of the present invention.

DETAILED DESCRIPTION OF THE INVENTION

The present invention describes a partition error monitoring method that includes detecting and reporting partition errors that cause the partition to fail (i.e., become inoperative). FIGS. 1-7 describe hardware, software, and data structures which are fundamental to the present invention. FIGS. 8-11 depict flow charts which collectively describe methods of the present invention for an error monitoring of partitions in a computer system.

Figure 1:
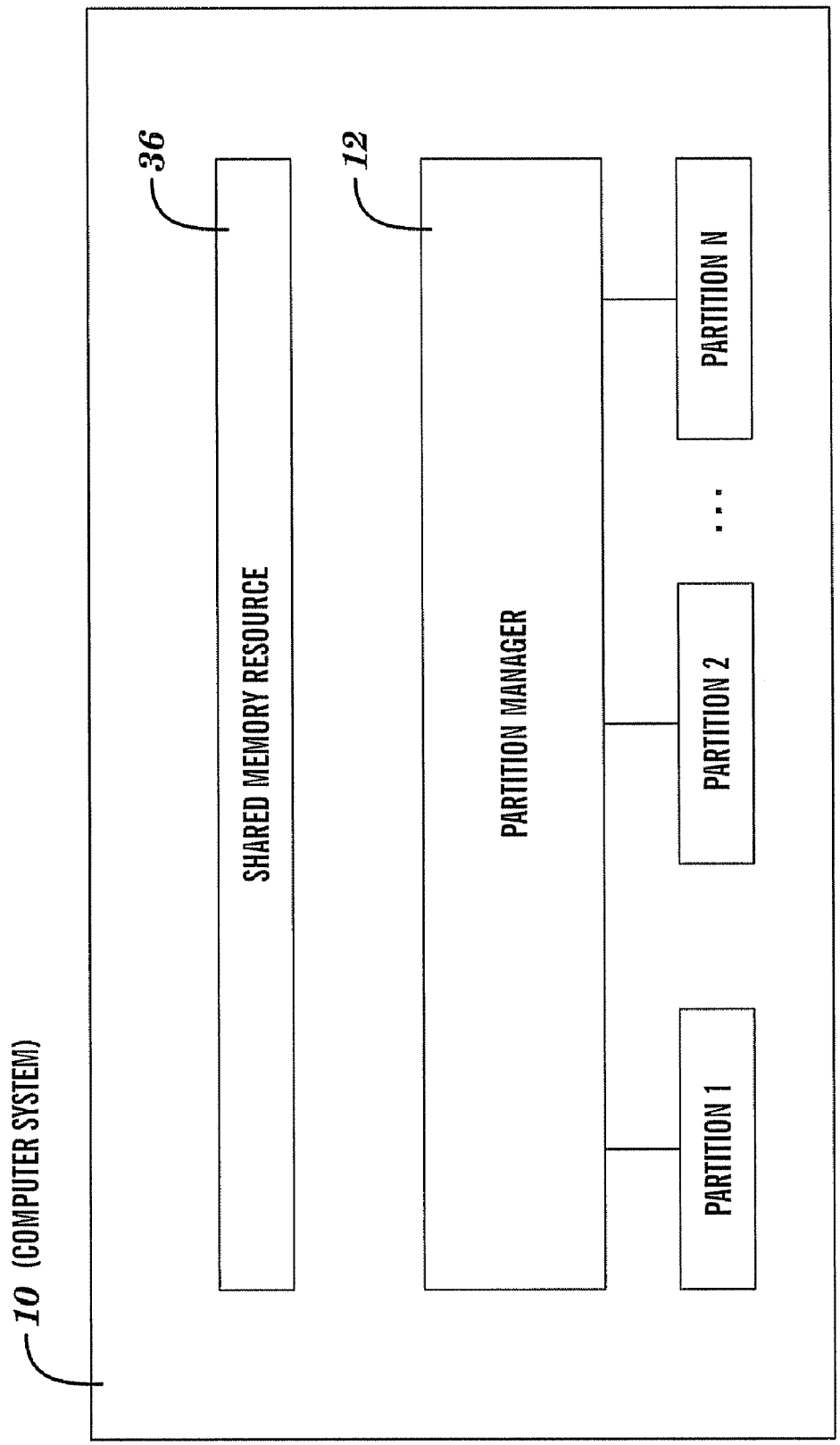
FIG. 1 illustrates partitions, a partition manager, and a shared memory resource of a computer system, in accordance with embodiments of the present invention.

FIG. 1 illustrates N partitions, a partition manager 12, and a shared memory resource 36, of a computer system 10, in accordance with embodiments of the present invention. The computer system 10 also has a hardware configuration (i.e., processor, memory devices, input/output devices, etc.) such as, inter alia, the hardware configuration shown in the computer system 90 in FIG. 7, described infra. In FIG. 1, the partitions are denoted as partition 1, partition 2, . . . , partition N, wherein N is at least 2. Each partition shares resources (processor, memory, input/output, etc.) of the overall computer system 10 such that the partition is adapted to functions as an autonomous computer system having its own operating system. The partition manager 12 is software that manages the N partitions and is used in conjunction with the partition error monitoring method of the present invention, as will be described infra in conjunction FIGS. 8-9.

Each partition has a RUNNING status or a FAIL status. A partition having a FAIL status is called a FAIL partition. A partition has the FAIL status if the partition has failed (i.e., has stopped running or cannot run) due to an error condition that has caused the partition to stop running or to be unable to run. Some error conditions will cause a partition to fail; other error conditions will not cause a partition to fail. A partition has the RUNNING status if the partition does not have the FAIL status, such as when the partition is running, or is idle but is capable of running. A partition having the RUNNING status is called a "running partition".

The fact that a partition has FAIL status does not imply that the FAIL partition has to be powered down. The present invention discloses a partition error monitoring method that enables efficient detection and reporting of errors in the FAIL partition without having to power down the FAIL partition.

The shared memory resource 36 may comprise, inter alia, a Non Volatile Random Access Memory (NVRAM). The shared memory resource 36 is outside of the N partitions and is shared by the N partitions. The content of the shared memory resource 36 will be described infra in conjunction with FIG. 4.

Figure 2:
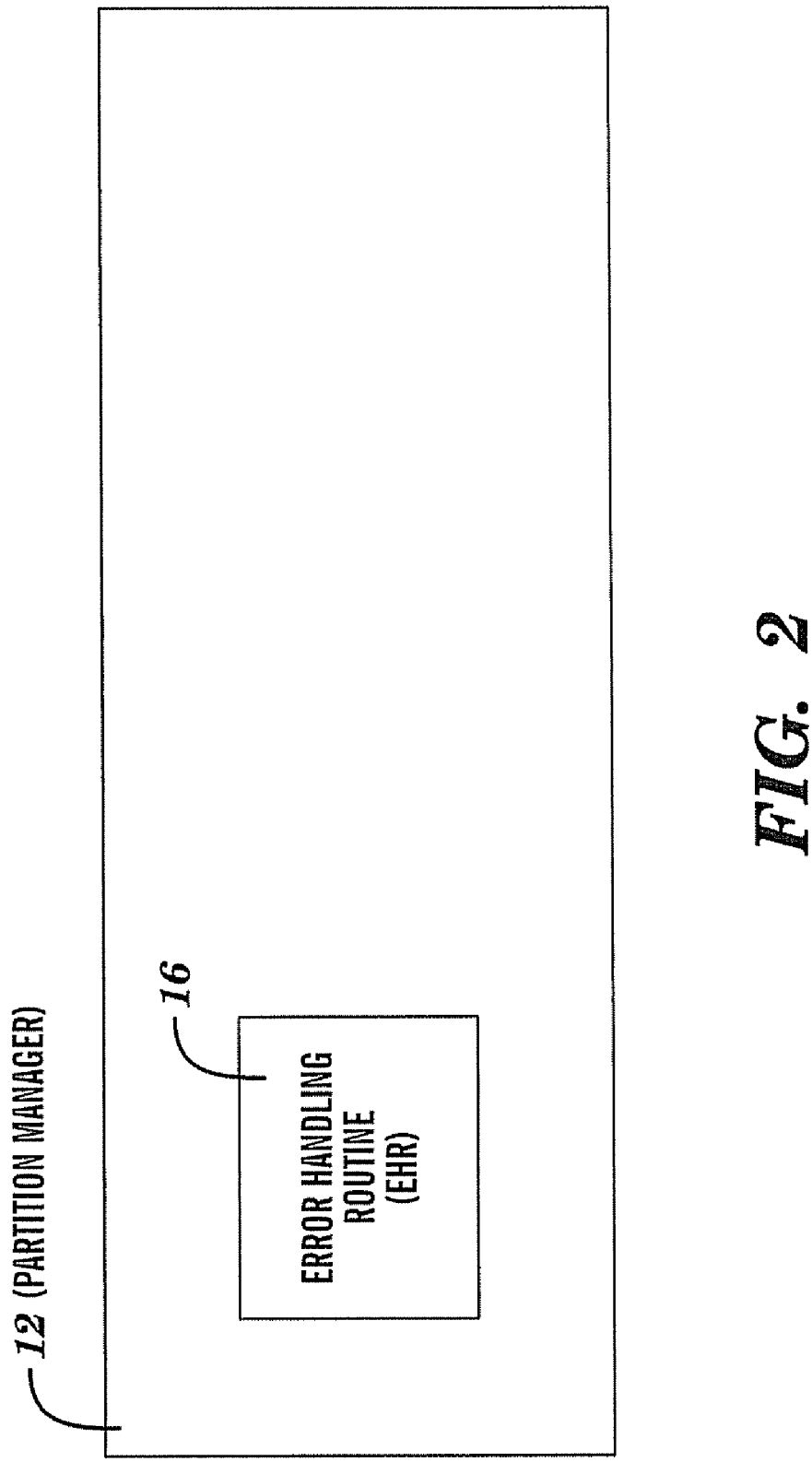
FIG. 2 illustrates the partition manager of FIG. 1, in accordance with embodiments of the present invention.

FIG. 2 illustrates the partition manager 12 of FIG. 1, in accordance with embodiments of the present invention. The partition manager 12 comprises, inter alia, an error handling routine 16. The error handling routine 16 is used in conjunction with the partition error monitoring method of the present invention, as will be described infra in conjunction FIG. 10. The status of each partition may be determined directly or indirectly by the partition manager 12.

Figure 3:
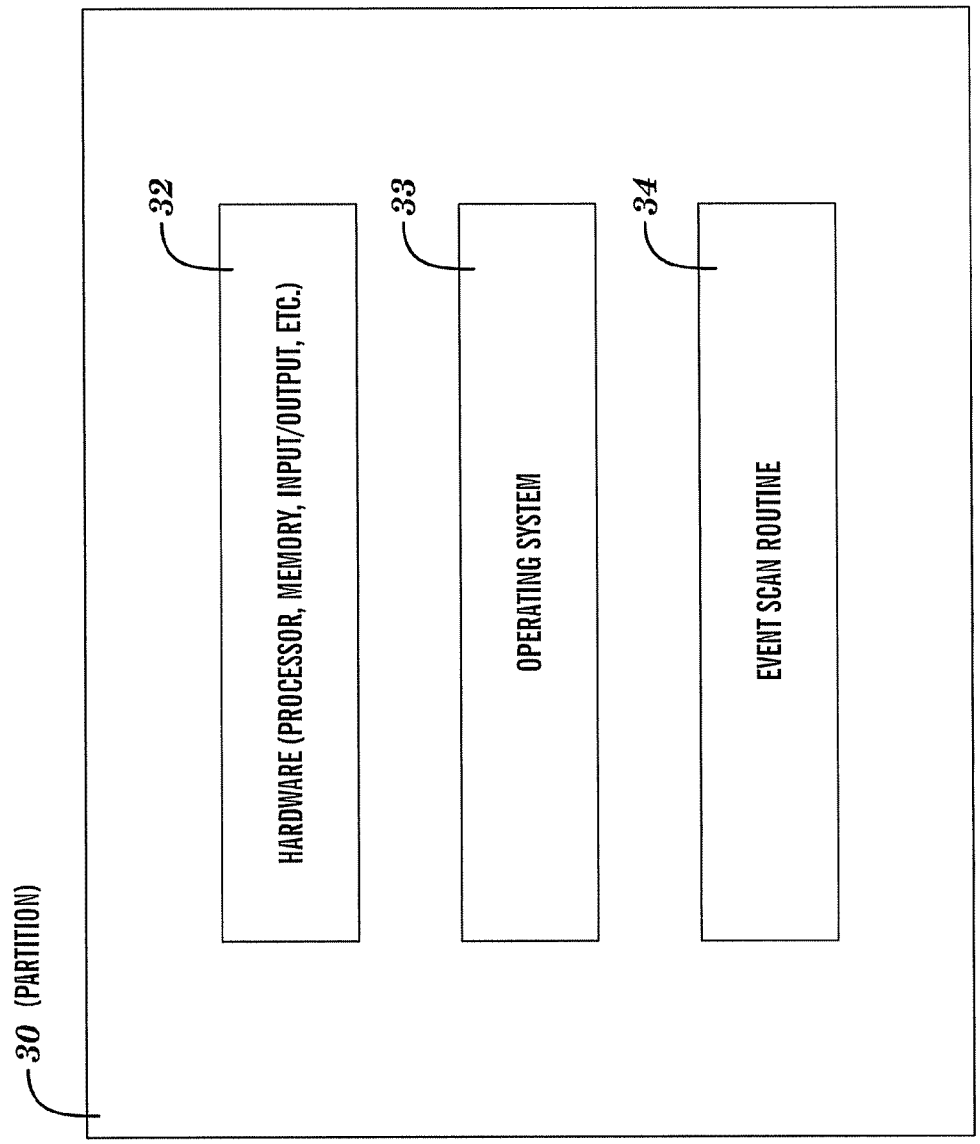
FIG. 3 illustrates a partition of FIG. 1, in accordance with embodiments of the present invention.

FIG. 3 illustrates a partition 30 representing any partition of the N partitions of FIG. 1, in accordance with embodiments of the present invention. The partition 30 comprises, inter alia, hardware 32, an operating system 33, and an event scan routine 34. The hardware 32 (i.e., processor, memory, input/output, etc.) is sufficient, together with necessary software, to enable the partition 30 to function as an autonomous computer system. The hardware 32 of the partition 30 will be related to hardware of a computer system 90 in a discussion infra of FIG. 7. The operating system 33 is part of a software package that, together with the hardware 32, enables the partition 30 to function as an autonomous computer system. The event scan routine 34 is used in conjunction with the partition error monitoring method of the present invention, as will be described infra in conjunction FIG. 11.

Figure 4:
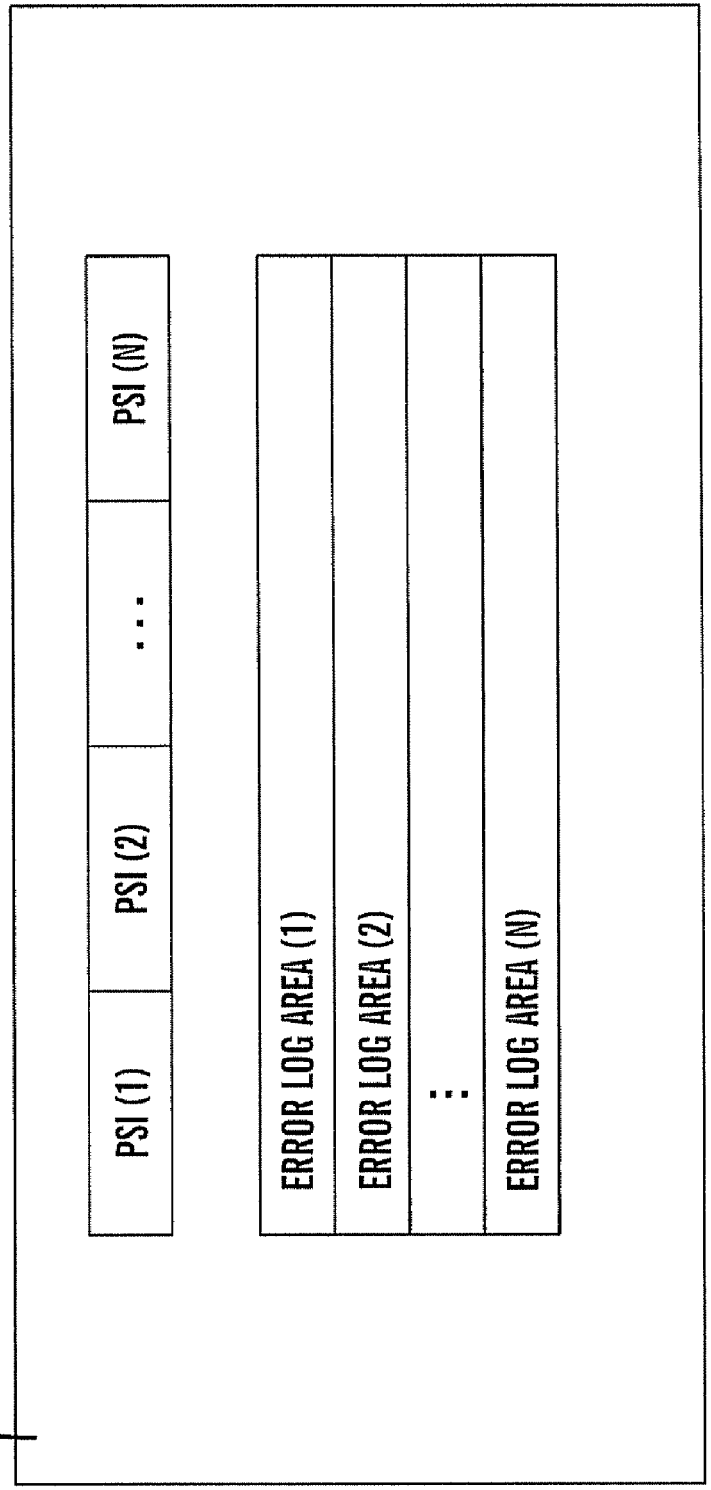
FIG. 4 illustrates the shared memory resource of FIG. 1 which comprises partition status indicators and error log areas, in accordance with embodiments of the present invention.

FIG. 4 illustrates the shared memory resource 36 of FIG. 1. The shared memory resource 36 comprises N partition status indicators and N error log areas (ELAs), in accordance with embodiments of the present invention. The shared memory resource 36 may comprise a storage area of one physical data storage device for storing the N partition status indicators and N error log areas. The shared memory resource 36 may alternatively store the N partition status indicators and N error log areas in storage areas of a plurality of physical data storage devices.

In FIG. 4, the N partition status indicators are denoted as PSI(1), PSI(2), . . . , PSI(N) respectively associated with Partition 1, Partition 2, . . . , Partition N of FIG. 1. The partition status indicator PSI(I) denotes either the RUNNING status or FAIL status of partition I, for I=1, 2, . . . , N. Each of the N partition status indicators may have any configuration for storing the RUNNING status or FAIL status. For example, the partition status indicator may comprise a binary bit whose binary value denotes the RUNNING status or the FAIL status of the partition. As another example, the partition status indicator may comprise a byte, or a sequence of bytes, adapted to store a character string that denotes the RUNNING status or the FAIL status of the partition. For example, the character strings "R" and "F" (or "RUNNING" or "FAIL") may denote the RUNNING status and the FAIL status, respectively.

Partition I is adapted to update the partition status indicator PSI(I) for I=1, 2, . . . , N, so that partition I may set PSI(I) to FAIL status when partition I detects an error condition in partition I that will cause, or has caused, partition I to fail.

Whenever partition I is booted, the RUNNING/FAIL status of partition I is determined by partition I or by the partition manager 12 of FIG. 1, and PSI(I) is accordingly set to said RUNNING/FAIL status of partition I.

In FIG. 4, the N error log areas are denoted as Error Log Area(1), Error Log Area(2), . . ., Error Log Area(N) which are respectively associated with Partition 1, Partition 2, . . . , Partition N of FIG. 1. The Error Log Area(I) comprises information relating to one or more errors previously detected for partition I, wherein I=1, 2, . . . , N. The Error Log Area(I) comprises information concerning errors in partition I causing partition I to fail, as well as errors in partition I not causing partition I to fail. The N error log areas in FIG. 4 may each be in any data format that stores data (i.e., file format, record format, etc.). Each of the N error log areas in FIG. 4 may be stored contiguously within the shared memory resource 36. The N error log areas in FIG. 4 may alternatively be stored non-contiguously within the shared memory resource 36 (e.g., with a fixed address offset for successive error entries, via a pointer from an error entry to a next successive error entry, etc.). The content of each of the N error log areas is disclosed infra in conjunction with FIGS. 5 and 6.

FIG. 5 illustrates an error log area (ELA) 38 representing any of the N error log areas of FIG. 4, in accordance with embodiments of the present invention. The error log area 38 has M error entries Entry(1), Entry(2), . . . , Entry (M), wherein M=0 or M is a positive integer. If M=0 then the error log area 38 is empty; i.e., the error log area 38 does not comprise any error entries. The M error entries in FIG. 5 may be in any data format that stores data (i.e., file format, record format, Common Hardware Reference Platform (CHRP) format, etc.) and distributed contiguously or non-contiguously within the error log area 38. Each error entry in the error log area 38 pertains to a single detected error condition in the partition associated with the error log area 38. The single detected error condition may pertain to an error in a partition causing the partition to fail, or to an error in the partition not causing the partition to fail.

FIG. 6 depicts data content in any of the M error entries of FIG. 5, in accordance with embodiments of the present invention. FIG. 6 shows that the error entry comprises the items of: partition identifier (PI), entry status indicator (ESI), and error descriptor (ED). The items of PI, ESI, and ED may be distributed contiguously or non-contiguously within the error log area 38. The partition identifier (PI) identifies the partition having the detected error. The entry status identifier (ESI) indicates a READ status or UNREAD status of the error entry. The meaning of READ Status and UNREAD Status will be explained infra in conjunction with FIGS. 10-11. The entry status identifier (ESI) may have any configuration for storing the READ status or UNREAD status. For example, the entry status identifier (ESI) may comprise a binary bit whose binary value denotes the READ status or the UNREAD status of the error entry. As another example, the entry status identifier (ESI) may comprise a byte, or a sequence of bytes, adapted to store a character string that denotes the READ status or the UNREAD status of the error entry. For example, the character strings "R" and "U" (or "READ" and "UNREAD") may denote the READ status and the UNREAD status, respectively.

In FIG. 6, the error descriptor (ED) describes the detected error for the partition. The error descriptor may be in any format for describing the detected error. For example, the error descriptor may consist of a single ASCII character that stands for a particular error condition. As another example, the error descriptor may comprise a first part identifying the error generally (e.g., a input/output error) and a second part containing text describing the error more specifically (e.g., power disabled to a specified input/output data storage device such as an optical disc drive).

Figure 7:
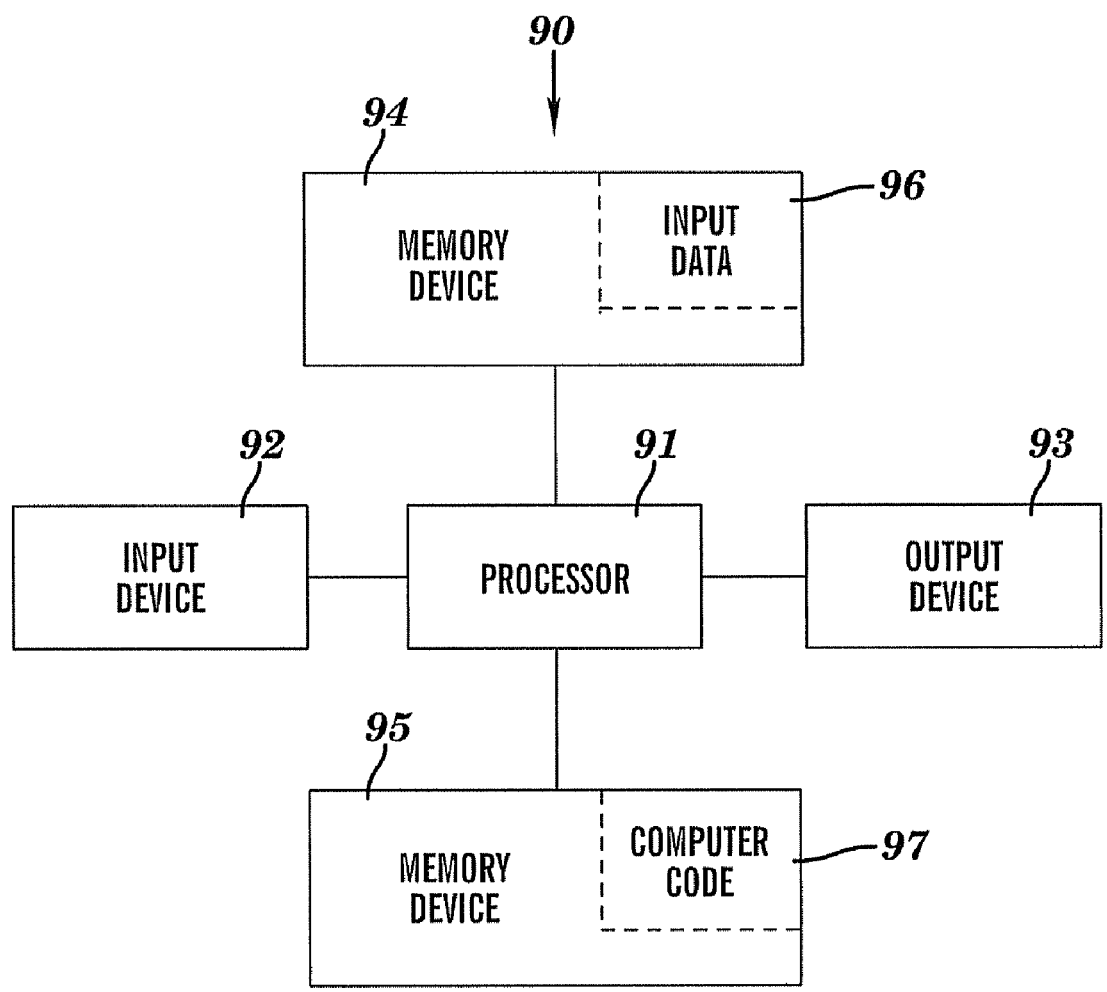
FIG. 7 illustrates a computer system used in conjunction with error monitoring of partitions, in accordance with embodiments of the present invention.

FIG. 7 illustrates a computer system used in conjunction with error monitoring of partitions, in accordance with embodiments of the present invention. The computer system 90 comprises the hardware 32 of the partition 30 of FIG. 3. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm used in conjunction with error monitoring of partitions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device). While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

The computer system 90 of FIG. 7 describes the hardware configuration of the overall computer system 10 of FIG. 1, wherein the overall computer system 10 of FIG. 1 comprises the N partitions, and wherein the computer code 97 in FIG. 7 represents any software used by the overall computer system 10 of FIG. 1 (e.g., the partition manager 12 of FIG. 1). The computer system 90 of FIG. 7 also describes the hardware 32 of the partition 30 of FIG. 3, wherein the computer code 97 in FIG. 7 represents any software used by the partition 30 of FIG. 3 (e.g., the operating system 33 and event scan routine 34 in FIG. 3). Thus, the overall computer code or software that collectively implements the partition error monitoring method of the present invention may be in at least one computer usable medium. The N partitions of FIG. 1 may share some of the hardware resources shown in FIG. 7 (e.g., the shared memory resource 36 in FIG. 1, which may be represented by at least one of the memory devices 94 and 95 of FIG. 7).

FIGS. 8-11 depict flow charts collectively describing a method for error monitoring of partitions in a computer system, in accordance with embodiments of the present invention. The algorithms associated with FIGS. 8-11 are implemented by the computer code(s) 97 of FIG. 7.

Figure 8:
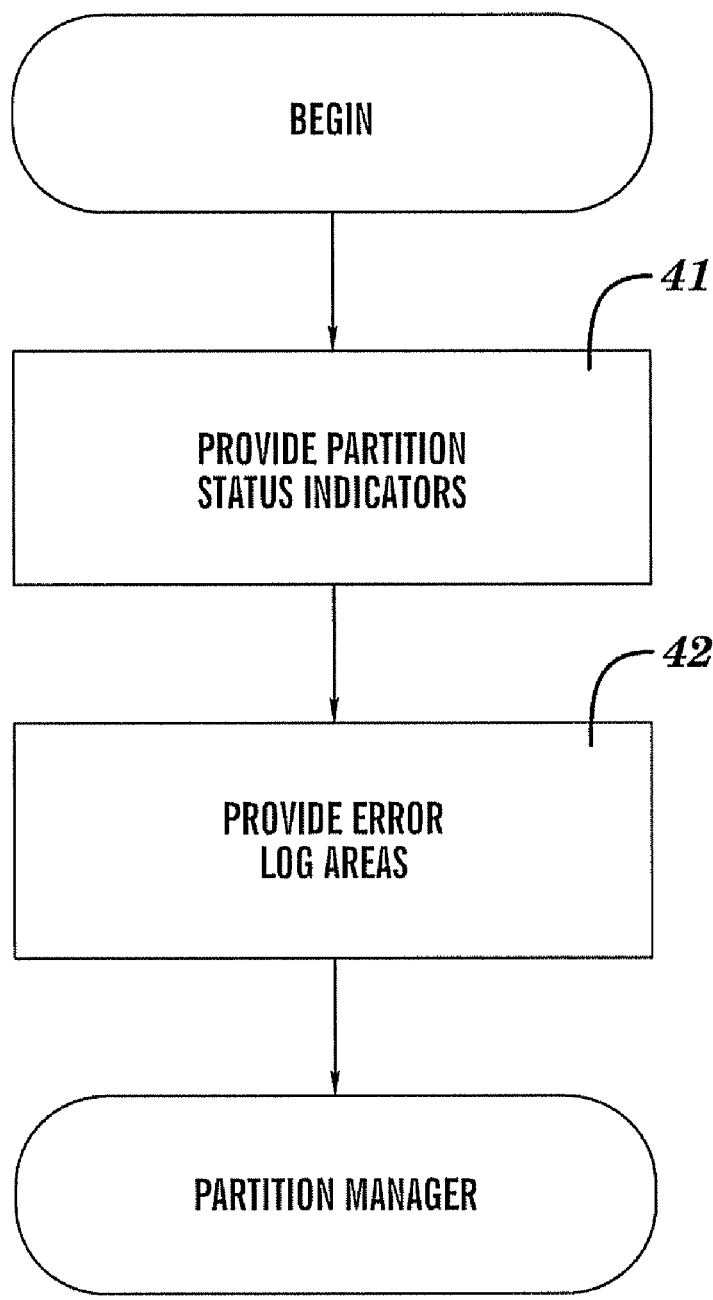
FIGS. 8-11 depict flow charts collectively describing a method for error monitoring of partitions in a computer system, in accordance with embodiments of the present invention.

FIG. 8 is a flow chart comprising steps 41-42 which initialize the partition error monitoring method of the present invention. Step 41 provides the N partition status indicators (i.e., PSI(1), PSI(2), . . . , PSI(N)) which have been described supra in conjunction with FIG. 4. Step 42 provides the N error log areas (i.e., Error Log Area(1), Error Log Area(2), . . . , Error Log Area(N)) which has been described supra in conjunction with FIGS. 4-6.

Figure 9:
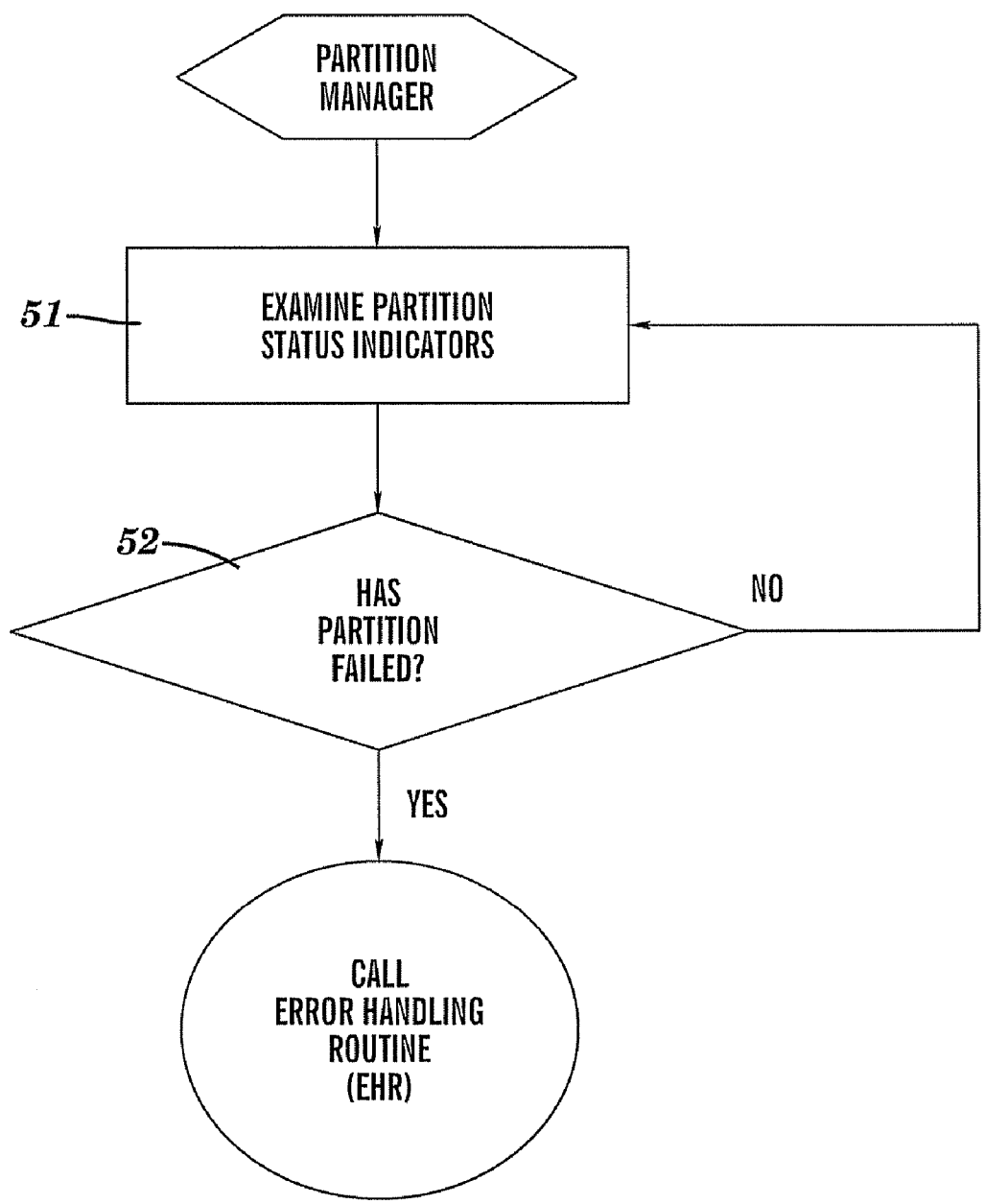

FIG. 9 is a flow chart comprising steps 51-52 which is executed by the partition manager 12 of FIG. 1. Step 51 examines the N partition status indicators PSI(I) (I=1, 2, . . . , N). Step 52 determines, based on the examining of PSI(I) in step 51, whether partition I has FAIL status (I=1, 2, . . . , N). Note that partition I denotes the specific partition determined in step 51 to have the FAIL status and partition I may represent any partition of the N partitions. If step 52 determines that partition I does not have FAIL status (i.e., I has RUNNING status), then the method loops back to step 51. If step 52 determines that partition I has FAIL status, then step 53 is next executed. Step 53 calls the error handling routine 16 of FIG. 2 to perform an error procedure on the FAIL partition I as described next.

Figure 10:
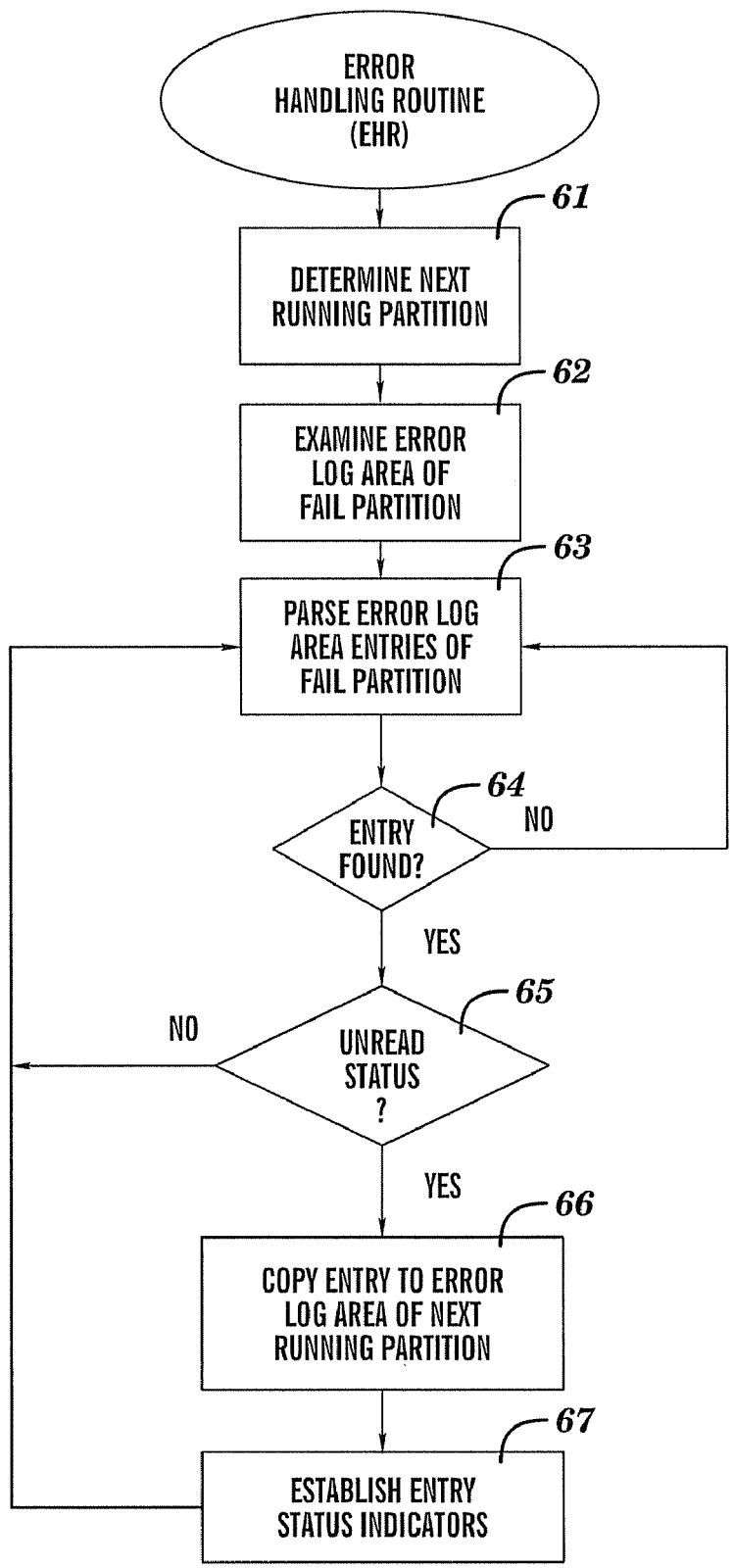

FIG. 10 is a flow chart comprising steps 61-67 which describe an error procedure on the FAIL partition I (i.e., the FAIL partition determined step 52 of FIG. 9 to have a FAIL status). The error procedure of FIG. 10 is implemented by the error handling routine 16 of FIG. 2. Step 61 determines the next running partition, which is a partition J (J=1, 2, . . . , N subject to J≠I) having a RUNNING status. Whether a partition is a running partition may be determined by checking the partition status indicator (PSI) of the partition or by any other mechanism for determining whether partition is a running partition. Partition J (i.e., the next running partition) may be selected by any of several methods including, inter alia: selecting partition J randomly from all running partitions of the N partitions; selecting partition J as the most recently selected next running partition of the previously selected next running partitions; selecting partition J as the next running partition after partition I in the following sequence of partitions: partition I, partition I+1, . . . , partition N, partition 1, . . . , partition I−1; selecting partition J as the next preferred running partition from a list of partitions listed in order of preference, wherein said list may stored in a file, table, etc; selecting partition J by executing an algorithm or a mapping between partitions; etc.

Step 62 examines the error log area of the FAIL partition (i.e., partition I). Step 62 and subsequent steps 63-67 are may be implemented periodically (e.g., every 10 seconds) or in accordance with a scheduling procedure (e.g., a scheduling algorithm).

Step 63 parses the error log area of the FAIL partition to isolate the error entries in the error log area of the FAIL partition.

Step 64 determines whether the parsing of step 63 has found the next error entry in the error log area of the FAIL partition. If step 64 has not found said next error entry, then the method loops back to step 63. If step 64 has found said next error entry, then step 65 is next executed.

Step 65 determines whether the next error entry found in step 64 has UNREAD status, by examining the entry status indicator (ESI) of the next error entry (see FIG. 6 for a description of ESI). If step 65 determines that the next error entry does not have UNREAD status then the method loops back to step 63 to continue parsing the error log area of the FAIL partition, and the parsing in step 63 ends when the error log area of the UNREAD partition has been fully parsed such that all error entries herein have been examined for having UNREAD status. If step 65 determines that the next error entry does has UNREAD status then step 66 is next executed.

Step 66 copies the next error entry found in step 64, and determined in step 65 to have UNREAD status, to the error log area of the next running partition (i.e., partition J). The failed partition I having the FAIL status for the copied error entry in the error log area of partition J may be identified via the partition identifier (PI) of the next error entry (see FIG. 6 for a description of PI).

Step 67 establishes the entry status indicator (ESI) of the next error entry in the error log areas of partition I (i.e., the failed partition) and partition J (i.e., the next running partition). The ESI of the next error entry in the error log area of partition I is set to READ status, so that subsequent copying of the same next error entry from partition I will be prevented. In contrast, the UNREAD status is retained in the ESI of the next error entry copied into the error log area of partition J, so that the next error entry in the error log area of partition J may be subsequently utilized to assist in correcting the error that caused partition I to fail, as will be described infra in conjunction with FIG. 11. Thus, the READ/UNREAD status of an error record is not a property of the error record alone, but is a property of the error record in conjunction with where the error record is stored, as illustrated in step 67 wherein the same FAIL error record I has the READ status in the error log area of partition I and has the UNREAD status in the error log area of partition J.

Figure 11:
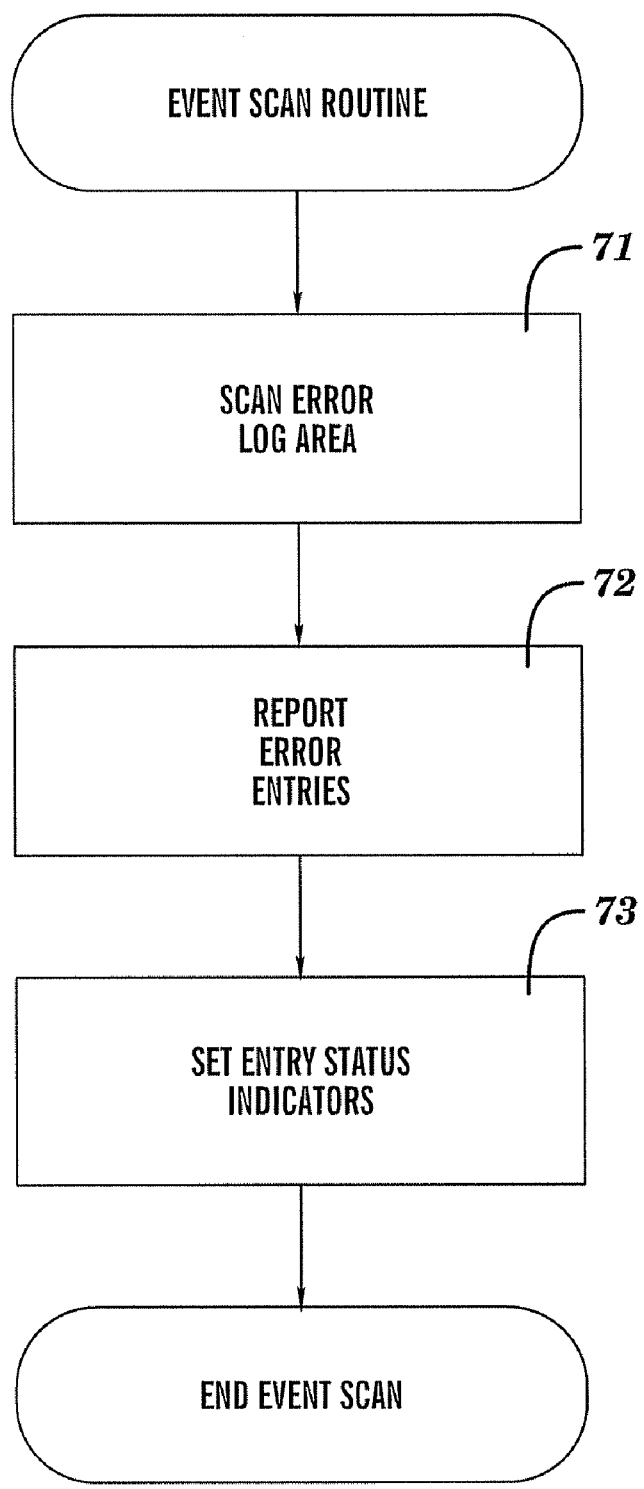

FIG. 11 is a flow chart comprising steps 71-73 which are executed by the event scanning routine 34 (see FIG. 3) of the next running partition (i.e., partition J).

Step 71 scans the error log area of partition J to find error entries of the FAIL partition (i.e., partition I) which have UNREAD status in the error log area of partition J. Step 71 identifies error entries of partition I by examining the partition identifier (PI) in the error entry. Step 71 determines whether an error entry of partition I has UNREAD status in the error log area of partition J by examining the error status indicator (ESI) in the error entry in the error log area of partition J.

Step 72 reports each error entry of partition I having UNREAD status error in the log area of partition J to: the operating system of partition J, the operating system of partition I if the operating system of partition I is able to receive said error entries of partition I (even though partition I is otherwise incapable of functioning), and/or the partition manager 12 of FIG. 1. Said reporting of the error entries enables an administrator or user to take corrective action to fix the error that caused partition I to fail. This enables the detail of the errors in the error descriptor (ED) of the error entry (see FIG. 6) to be available soon after an error was encountered for partition I, without powering down partition I.

Step 73 sets the entry status indicator (ESI) to READ for each error entry in the log area of partition J that is reported in step 72, which prevents duplicative reporting of the error entries by the event scanning routine 34 (see FIG. 3) of partition J.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for error monitoring of a plurality of partitions in a computer system, said method comprising executing a computer readable program code stored on at least one computer usable medium of the computer system, said executing comprising:

providing a partition status indicator (PSI) for each partition of the plurality of partitions, said partition status indicator denoting a RUNNING status or a FAIL status of the partition;

providing an error log area for each partition, said error log area configured to store at least one error entry pertaining to the partition, each error entry including an entry status indicator (ESI), said entry status identifier indicating a READ status or UNREAD status of the error entry;

ascertaining, during a booting of each partition, whether each partition has the RUNNING status or the FAIL status and setting the partition status indicator of each partition as the RUNNING status or the FAIL status if said ascertaining has ascertained that each partition has the RUNNING status or the FAIL status, respectively;

examining the partition status indicator of each partition to determine whether the partition has the FAIL status, each examined partition being denoted as a first partition; and performing an error procedure for each first partition having the FAIL status as determined by said examining, said performing comprising:

copying each error entry in the error log area of the first partition whose entry status indicator indicates the UNREAD status into the error log area of a second partition of the plurality of partitions, said second partition being a running partition;

setting the entry status indicator to the READ status for each copied error entry in the error log area of the first partition; and having the entry status indicator set to the UNREAD status for each copied error entry in the error log area of the second partition.

2. The method of claim 1, said error procedure for the first partition further comprising:

scanning the error log area of the second partition for an existence of one or more error entries of the first partition;

reporting information comprising each error entry of the one or more error entries determined to exist by said scanning; and setting the entry status indicator to the READ status for each error entry of the one or more error entries determined to exist by said scanning.

3. The method of claim 2, wherein said reporting comprises reporting said information to an operating system of the second partition or to a partition manager that manages the plurality of partitions.

4. The method of claim 1, wherein each partition of the plurality of partitions is configured to update its partition status indicator.

5. The method of claim 1, wherein the partition status indicator for each partition and/or the error log area for each partition is located in a shared memory resource of the computer system.

6. The method of claim 1, wherein each error entry for each partition further includes a partition identifier (PI) that identifies the partition and error identifier (EI) that identifies a detected error for the partition.

7. A computer program product, comprising at least one computer usable medium having a computer readable program code embodied therein, said computer readable program code comprising an algorithm configured to implement a method for monitoring a plurality of partitions in a computer system, said method comprising:

providing a partition status indicator (PSI) for each partition of the plurality of partitions, said partition status indicator denoting a RUNNING status or a FAIL status of the partition;

providing an error log area for each partition, said error log area configured to store at least one error entry pertaining to the partition, each error entry including an entry status indicator (ESI), said entry status identifier indicating a READ status or UNREAD status of the error entry;

ascertaining, during a booting of each partition, whether each partition has the RUNNING status or the FAIL status and setting the partition status indicator of each partition as the RUNNING status or the FAIL status if said ascertaining has ascertained that each partition has the RUNNING status or the FAIL status, respectively;

examining the partition status indicator of each partition to determine whether the partition has the FAIL status, each examined partition being denoted as a first partition; and performing an error procedure for each first partition having the FAIL status as determined by said examining, said performing comprising:

copying each error entry in the error log area of the first partition whose entry status indicator indicates the UNREAD status into the error log area of a second partition of the plurality of partitions, said second partition being a running partition;

setting the entry status indicator to the READ status for each copied error entry in the error log area of the first partition; and having the entry status indicator set to the UNREAD status for each copied error entry in the error log area of the second partition.

8. The computer program product of claim 7, said error procedure for the first partition further comprising:

scanning the error log area of the second partition for an existence of one or more error entries of the first partition;

reporting information comprising each error entry of the one or more error entries determined to exist by said scanning; and setting the entry status indicator to the READ status for each error entry of the one or more error entries determined to exist by said scanning.

9. The computer program product of claim 8, wherein said reporting comprises reporting said information to an operating system of the second partition or to a partition manager that manages the plurality of partitions.

10. The computer program product of claim 7, wherein each partition of the plurality of partitions is configured to update its partition status indicator.

11. The computer program product of claim 7, wherein the partition status indicator for each partition and/or the error log area for each partition is located in a shared memory resource of the computer system.

12. The computer program product of claim 7, wherein each error entry for each partition further includes a partition identifier (PI) that identifies the partition and error identifier (EI) that identifies a detected error for the partition.

13. A computer system comprising a processor, a plurality of partitions, and a computer readable memory unit coupled to the processor, said memory unit containing instructions that when executed by the processor implement a method for monitoring the plurality of partitions in the computer system, said method comprising the computer implemented steps of:

providing a partition status indicator (PSI) for each partition of the plurality of partitions, said partition status indicator denoting a RUNNING status or a FAIL status of the partition;

providing an error log area for each partition, said error log area configured to store at least one error entry pertaining to the partition, each error entry including an entry status indicator (ESI), said entry status identifier indicating a READ status or UNREAD status of the error entry;

examining the partition status indicator of each partition to determine whether the partition has the FAIL status, each examined partition being denoted as a first partition;

ascertaining, during a booting of each partition, whether each partition has the RUNNING status or the FAIL status and setting the partition status indicator of each partition as the RUNNING status or the FAIL status if said ascertaining has ascertained that each partition has the RUNNING status or the FAIL status, respectively;

performing an error procedure for each first partition having the FAIL status as determined by said examining, said performing comprising:

copying each error entry in the error log area of the first partition whose entry status indicator indicates the UNREAD status into the error log area of a second partition of the plurality of partitions, said second partition being a running partition;

setting the entry status indicator to the READ status for each copied error entry in the error log area of the first partition; and having the entry status indicator set to the UNREAD status for each copied error entry in the error log area of the second partition.

14. The computer system of claim 13, said error procedure for the first partition further comprising:

scanning the error log area of the second partition for an existence of one or more error entries of the first partition;

reporting information comprising each error entry of the one or more error entries determined to exist by said scanning; and setting the entry status indicator to the READ status for each error entry of the one or more error entries determined to exist by said scanning.

15. The computer system of claim 14, wherein said reporting comprises reporting said information to an operating system of the second partition or to a partition manager that manages the plurality of partitions.

16. The computer system of claim 13, wherein each partition of the plurality of partitions is configured to update its partition status indicator.

17. The computer system of claim 13, wherein the partition status indicator for each partition and/or the error log area for each partition is located in a shared memory resource of the computer system.

18. The computer system of claim 13, wherein each error entry for each partition further includes a partition identifier (PI) that identifies the partition and error identifier (EI) that identifies a detected error for the partition.

\* \* \* \* \*